United States Patent
Huang et al.

(10) Patent No.: US 12,276,405 B2
(45) Date of Patent: Apr. 15, 2025

(54) MOUNTING FIXTURE, MEDIUM FOR CONNECTING A LAMP, AND LAMP ASSEMBLY

(71) Applicant: J-MEX Inc., Hsinchu (TW)

(72) Inventors: Chun-Yuan Huang, Hsinchu (TW); Bing-Ho Tsai, Hsinchu (TW); Yin-Tzu Huang, Hsinchu (TW)

( * ) Notice: Subject to any disclaimer, the term of this patent is extended or adjusted under 35 U.S.C. 154(b) by 9 days.

(21) Appl. No.: 17/964,764

(22) Filed: Oct. 12, 2022

(65) Prior Publication Data

US 2023/0204193 A1    Jun. 29, 2023

(30) Foreign Application Priority Data

Dec. 24, 2021 (TW) .................. 110215436

(51) Int. Cl.
*F21V 17/16* (2006.01)

(52) U.S. Cl.
CPC ................... *F21V 17/16* (2013.01)

(58) Field of Classification Search
CPC ... F21V 17/16; F21V 21/00; B62J 6/03; B62J 6/04; B62J 11/00; B62J 7/00
USPC ........................... 248/346.4, 346.5
See application file for complete search history.

(56) References Cited

U.S. PATENT DOCUMENTS

| | | | | |
|---|---|---|---|---|
| 6,109,765 A * | 8/2000 | Blanton | ............... | F21S 4/10 |
| | | | | 362/396 |
| 8,770,808 B1 * | 7/2014 | Campbell | ............... | B62J 11/00 |
| | | | | 362/800 |
| 10,113,735 B2 * | 10/2018 | Emerson | ............... | F21V 17/002 |
| 10,131,393 B2 * | 11/2018 | Chuang | ............... | B62J 9/27 |
| 10,414,331 B2 * | 9/2019 | Wu | ............... | B60Q 1/2607 |
| 11,173,977 B1 * | 11/2021 | Chen | ............... | B62J 6/057 |
| 2003/0174053 A1 * | 9/2003 | Rennick | ............... | G01S 7/521 |
| | | | | 340/425.5 |
| 2011/0233250 A1 * | 9/2011 | Nakajima | ............... | B62J 11/00 |
| | | | | 224/567 |
| 2017/0009952 A1 * | 1/2017 | Tai | ............... | F21S 43/315 |
| 2017/0261167 A1 * | 9/2017 | Tang | ............... | B60Q 1/20 |
| 2017/0292674 A1 * | 10/2017 | Wu | ............... | F21S 43/26 |
| 2019/0242552 A1 * | 8/2019 | Liu | ............... | F21V 5/02 |
| 2023/0204193 A1 * | 6/2023 | Huang | ............... | F21V 17/16 |
| | | | | 362/396 |
| 2023/0265987 A1 * | 8/2023 | Finch | ............... | F21L 4/02 |
| | | | | 362/296.08 |
| 2024/0295301 A1 * | 9/2024 | Gong | ............... | F21V 17/10 |

* cited by examiner

*Primary Examiner* — Muhammad Ijaz (57) ABSTRACT

A lamp assembly includes a lamp, a medium and an assembling piece. The medium is configured to connect the lamp to a carrier. The assembling piece is disposed between the lamp and the medium, and is configured to connect the lamp to the medium, wherein the assembling piece includes a first part and a second part. The first part is configured to non-threadedly connect the lamp with the medium. The second part is configured to release the lamp from the medium.

20 Claims, 6 Drawing Sheets

MOUNTING FIXTURE, MEDIUM FOR CONNECTING A LAMP, AND LAMP ASSEMBLY

CROSS REFERENCE TO RELATED APPLICATION

This application claims the benefit of Taiwan's patent application No. 110215436 filed on Dec. 24, 2021, at Taiwan's Intellectual Property Office, the disclosures of which are incorporated herein in their entirety by reference.

TECHNICAL FIELD

Embodiments of the present disclosure are related to a mounting fixture for mounting a lamp to a carrier of a bicycle, and more particularly, are related to a medium for connecting a lamp with a carrier, and a lamp assembly.

BACKGROUND

The conventional installation method of using a combined installation structure of to install the bicycle rack lamp is relatively cumbersome and inconvenient. The installation structure has to combine with the lamp to form a combination, then be installed on the rack, however, the bond strength of the combination is unreliable, and make it easy to loosen; and even falling off the rack due to the vibration occurred on the bicycle running on the road, causing the cyclist in anxious of bearing the risk of encountering accident as no warning light available. The present disclosure therefore proposes a new mounting installation fixture and mounting assembly method, which is not only relatively simple and convenient for installation, but also stable and secured for the lamps installed on the rack, and is not affected by vibration or other dynamic behaviors such as deceleration or acceleration encountered when riding the bicycle. The installation reliability of the lamp is ensured, causing the lamp to be stably fixed and not loose, and also ensures the lamp on the rack can reliably warn passers-by, reducing the various risks when riding, and ensuring the safety of the rider.

In addition, in the prior art, the mostly installation is directly to locked the bicycle lamp on the rack, and a tool is needed to disassemble the bicycle lamp from the rack, it is really inconvenient for installation and disassembly. Therefore, it is expected to propose a mounting installation fixture of for a lamp, which can meet the requirements of not only secured and convenient to be installed and but also easily disassembled.

SUMMARY OF INVENTION

In view of the drawbacks in the above-mentioned prior art, the present invention proposes a new mounting installation fixture for installing a lamp on a bicycle, such as a rack of a bicycle. The mounting installation fixture of the present disclosure is to combined a connector with the rack to form an adapter on the rack, and then without any tools, the lamp can be mounted on or separated from the adapter by hand, and the lamp can be easily installed on the rack, and easily disassembled by hand. In this way, the user can simply and conveniently perform the installation operation to securely install and fix a lamp on a bicycle rack. The lamp that is properly installed through this fixture won't be affected by the vibration of the bicycle when it is running, and it will not be loosened and fall off but is instead stably and reliably fixed on the bicycle rack.

In accordance with one embodiment of the present disclosure, a mounting fixture configured to connect a lamp with a carrier is provided, wherein the lamp has a snap socket. The mounting fixture includes a connector, a pre-stressed elastic member, a buckle structure, at least one positioning piece, a first snap hook and a pressing piece. The connector is configured to connect the mounting fixture with the carrier. The pre-stressed elastic member is configured to push the lamp, and forms a deformation for a pre-stressed elasticity. The buckle structure has a closing end for generating a buckling force, and an open end. The at least one positioning piece is for restricting a relative movement between the mounting fixture and the lamp. The first snap hook is configured to generate a snap pre-force in response to an elastic deformation of the mounting fixture, wherein the buckle structure and the first snap hook constitute a first pre-stressed structure to clamp the lamp to the mounting fixture through the buckling force and the snap pre-force. When the pressing piece is subject to an external force, the first snap hook is separated from the snap socket, wherein the pre-stressed elastic member has the pre-stressed elasticity urges against the carrier to separate the lamp from the mounting fixture.

In accordance with another embodiment of the present disclosure, a medium for connecting a lamp with a carrier is provided. The medium includes a medium body, a pre-stressed elastic member, a buckle structure and an assembling piece. The pre-stressed elastic member is disposed on the medium body and generates a deformation and a pre-stressed elasticity when the lamp is connected with the carrier. The buckle structure is configured to snap the lamp. The assembling piece has a first part configured to snap to the lamp with the buckle structure and a second part configured to release the first part and the buckle structure from the lamp through the pre-stressed elasticity.

In accordance with a further embodiment of the present disclosure, a lamp assembly is provided. The lamp assembly includes a lamp, a medium and an assembling piece. The medium is configured to connect the lamp to a carrier. The assembling piece is disposed between the lamp and the medium, and is configured to connect the lamp to the medium, wherein the assembling piece includes a first part and a second part. The first part is configured to non-threadedly connect the lamp with the medium. The second part is configured to release the lamp from the medium.

The above embodiments and advantages of the present invention will become more readily apparent to those ordinarily skilled in the art after reviewing the following detailed descriptions and accompanying drawings:

DETAILED DESCRIPTION OF THE PREFERRED EMBODIMENTS

Please refer to all Figs. of the present invention when reading the following detailed description, wherein all Figs. of the present invention demonstrate different embodiments of the present invention by showing examples, and help the skilled person in the art to understand how to implement the present invention. The present examples provide sufficient embodiments to demonstrate the spirit of the present invention, each embodiment does not conflict with the others, and new embodiments can be implemented through an arbitrary combination thereof, i.e., the present invention is not restricted to the embodiments disclosed in the present specification.

Figure 1A:
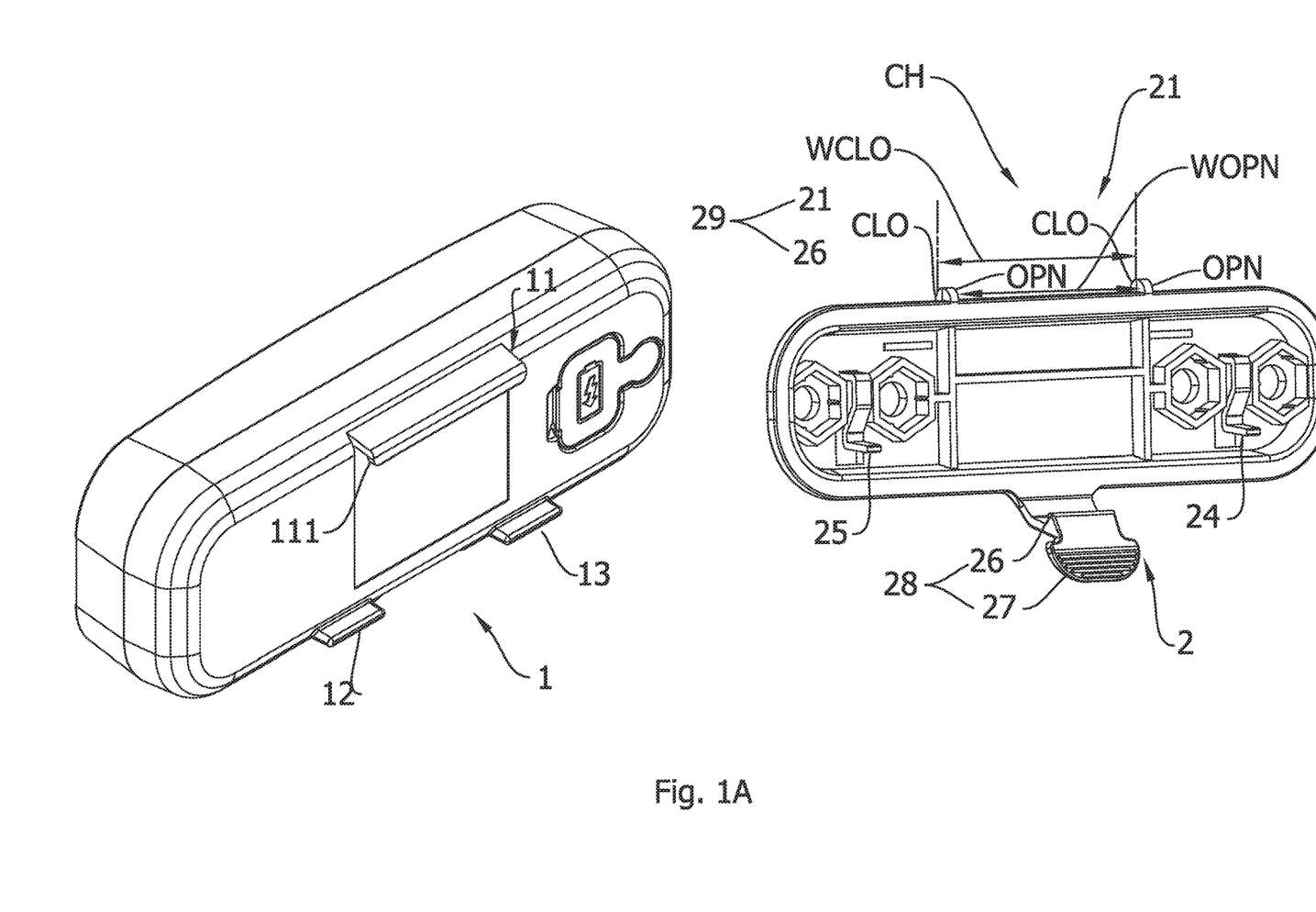
FIG. 1A is a schematic diagram showing a lamp and a mounting fixture according to a preferred embodiment of the disclosure.

Please refer to FIG. 1A, which is a schematic diagram showing a lamp 1 and a mounting fixture 2 according to a preferred embodiment of the disclosure. Please refer to FIG. 1B, which is a schematic diagram showing snapping positions of the lamp 1 and the mounting fixture 2 according to the preferred embodiment of the present disclosure. Please refer to FIG. 1C, which is a schematic diagram showing the mounting fixture 2 for disposing the lamp 1 to a carrier 9 according to a preferred embodiment of the present disclosure. Please refer to FIGS. 1A, 1B and IC. The lamp 1 has a snap seat 14; and the mounting fixture 2 includes a connector 34, a pre-stressed elastic member (24, 25), a buckle structure 21, at least one positioning piece (22, 23), a first snap hook 26 and a pressing piece 27. The connector 34 is configured to connect the mounting fixture 2 with the carrier 9. The pre-stressed elastic member (24, 25) is configured to push the lamp 1, and forms a deformation for a pre-stressed elasticity. The buckle structure 21 has a closed end CLO for generating a buckling force and an open end OPN. The at least one positioning piece (22, 23) is for restricting a relative movement between the mounting fixture 2 and the lamp 1. The first snap hook 26 is configured to generate a snap pre-force in response to an elastic deformation of the mounting fixture 2, wherein the buckle structure 21 and the first snap hook 26 constitute a first pre-stressed structure 29 to clamp the lamp 1 to the mounting fixture 2 through the buckling force and the snap pre-force. When the pressing piece 27 is subject to an external force, the first snap hook 26 is separated from the snap socket 14, wherein the pre-stressed elastic member (24, 25) has the pre-stressed elasticity urges against the carrier 9 to separate the lamp 1 from the mounting fixture 2.

Figure 1B:
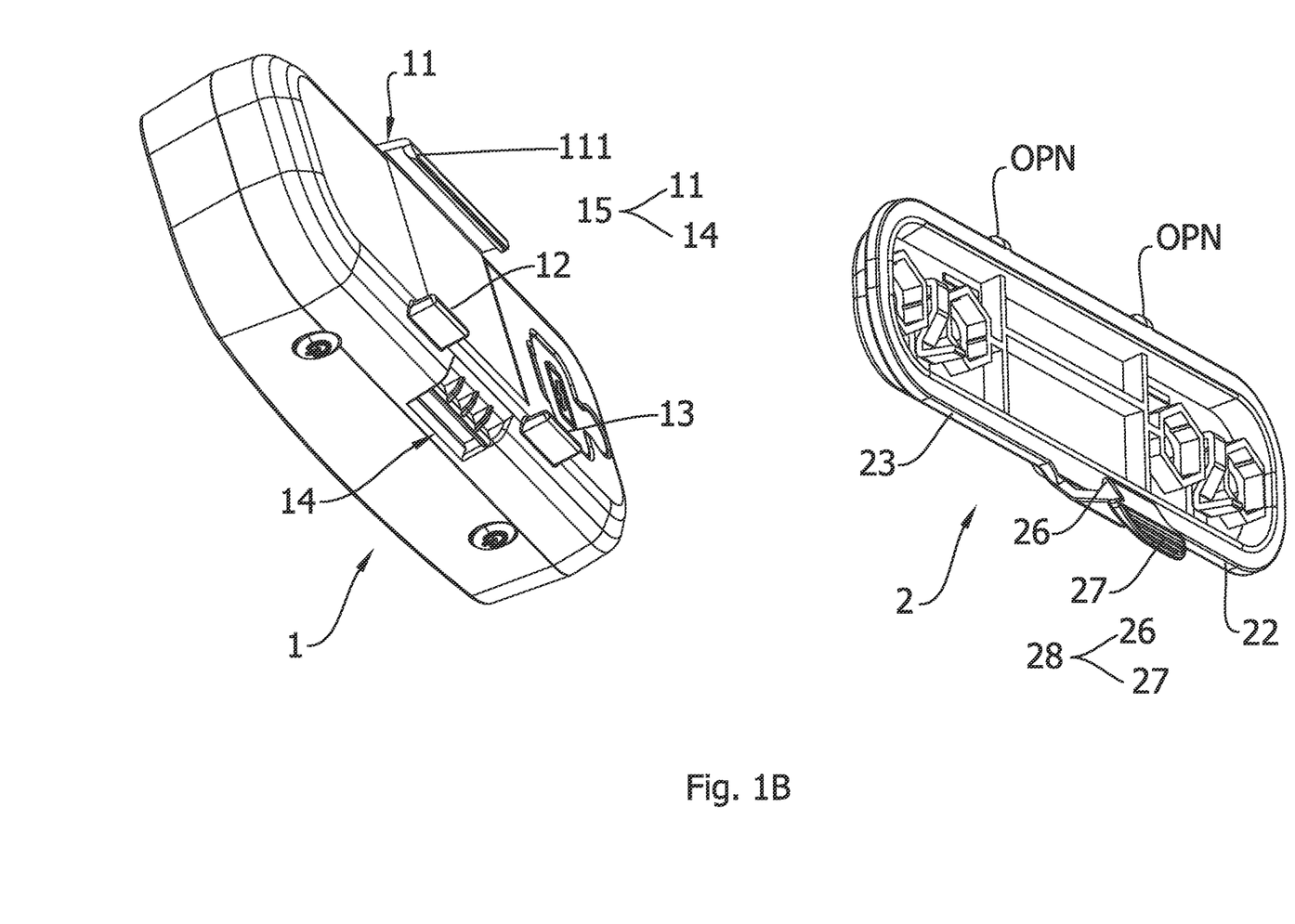
FIG. 1B is a schematic diagram showing snapping positions of the lamp and the mounting fixture according to the preferred embodiment of the present disclosure.
Figure 1C:
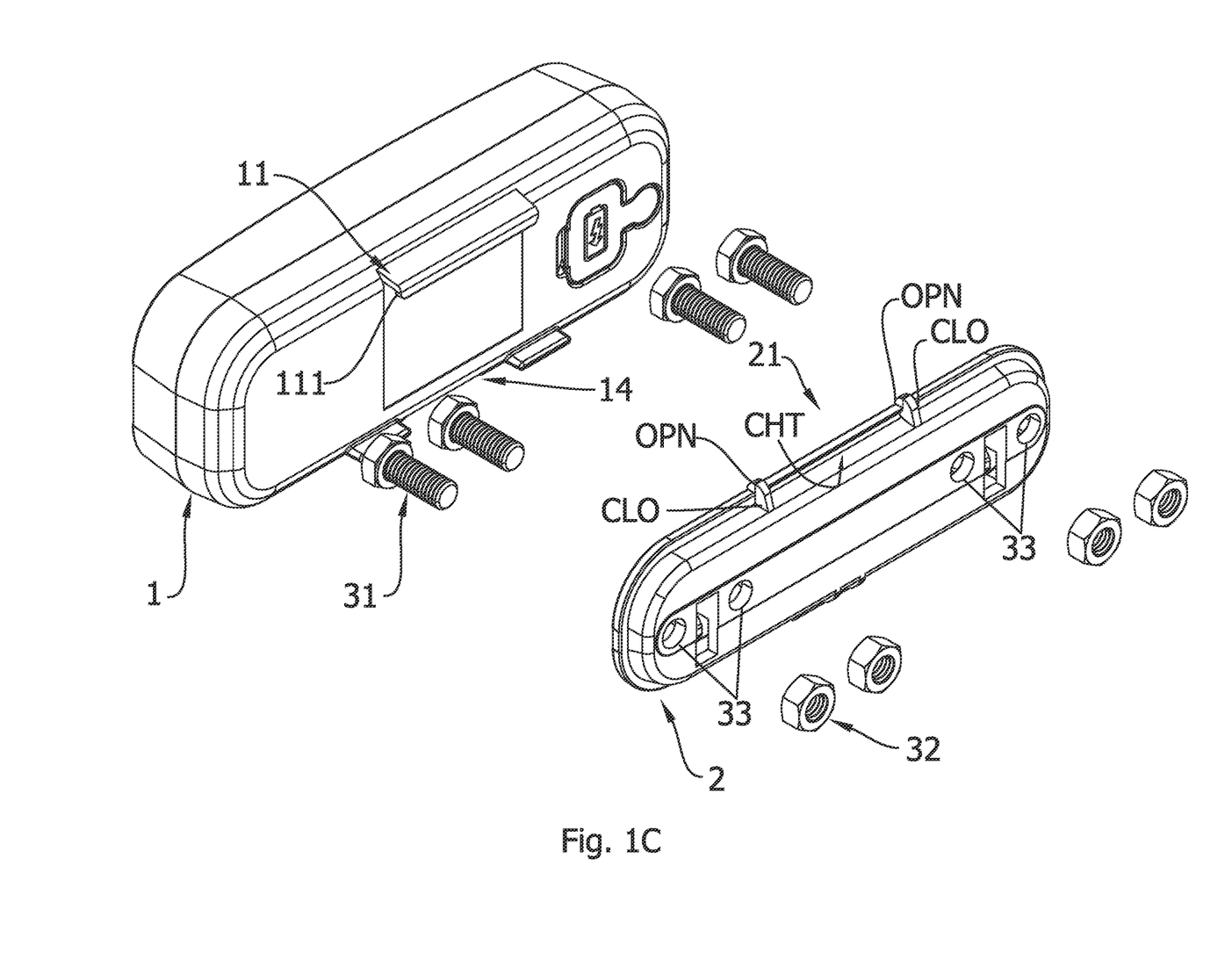
FIG. 1C is a schematic diagram showing the mounting fixture for disposing the lamp to a carrier according to a preferred embodiment of the present disclosure.

In any embodiment of the present disclosure, the connector 34 includes at least one set of bolt 31 and nut 32. The at least one set of bolt 31 passes through a bolt hole 33 (or at least of a bolt hole 33), locks the mounting fixture 2 to the carrier 9 by combining the bolt 31 and the nut 32 correspondingly. The lamp 1 further includes a buckle 11 and at least one positioning seat (12, 13); and the buckle 11 engages with the buckle structure 21. A position of the at least one positioning piece (22, 23) corresponds to that of the at least one positioning seat (12, 13), so as to limit the relative movement between the mounting fixture 2 and the lamp 1.

In any embodiment of the present disclosure, the first snap hook 26 of the mounting fixture 2 is snapped to the snap socket 14. FIG. 1A shows the back side of the lamp 1 and the inner side of the mounting fixture 2. The lamp 1 includes a buckle 11 having a second snap hook 111, and is combined with the buckle structure 21 by the second snap hook 111. The buckle structure 21 has an engaging channel CH having a shape of a rectangle, a trapezoid, or a combination thereof. The buckle structure 21 includes an open end OPN being close to the lamp 1 and a closed end CLO being close to the second snap hook 111, wherein the open end OPN is wider than the closed end CLO. The closed end CLO and the open end OPN have a closed size WCLO and an open size WOPN respectively, wherein the closed size WCLO is smaller than the open size WOPN.

In any embodiment of the present disclosure, the lamp 1 further includes a buckle 11 having a second snap hook 111; and the buckle 11 and the snap socket 14 respectively buckles to the buckle structure 21 and the first snap hook 26 to form a second pre-stressed structure 15 buckling the lamp 1 to the mounting fixture 2. The first snap hook 26 is integrally formed with the pressing piece 27 to form a mounting and dismounting element 28. The carrier 9 is a bicycle rack, a motorcycle rack or a car rack.

In any embodiment of the present disclosure, the pre-stressed elastic member (24, 25), the buckle structure 21, the first snap hook 26 and the pressing piece 27 are integrally formed with the mounting fixture 2.

Figure 1D:
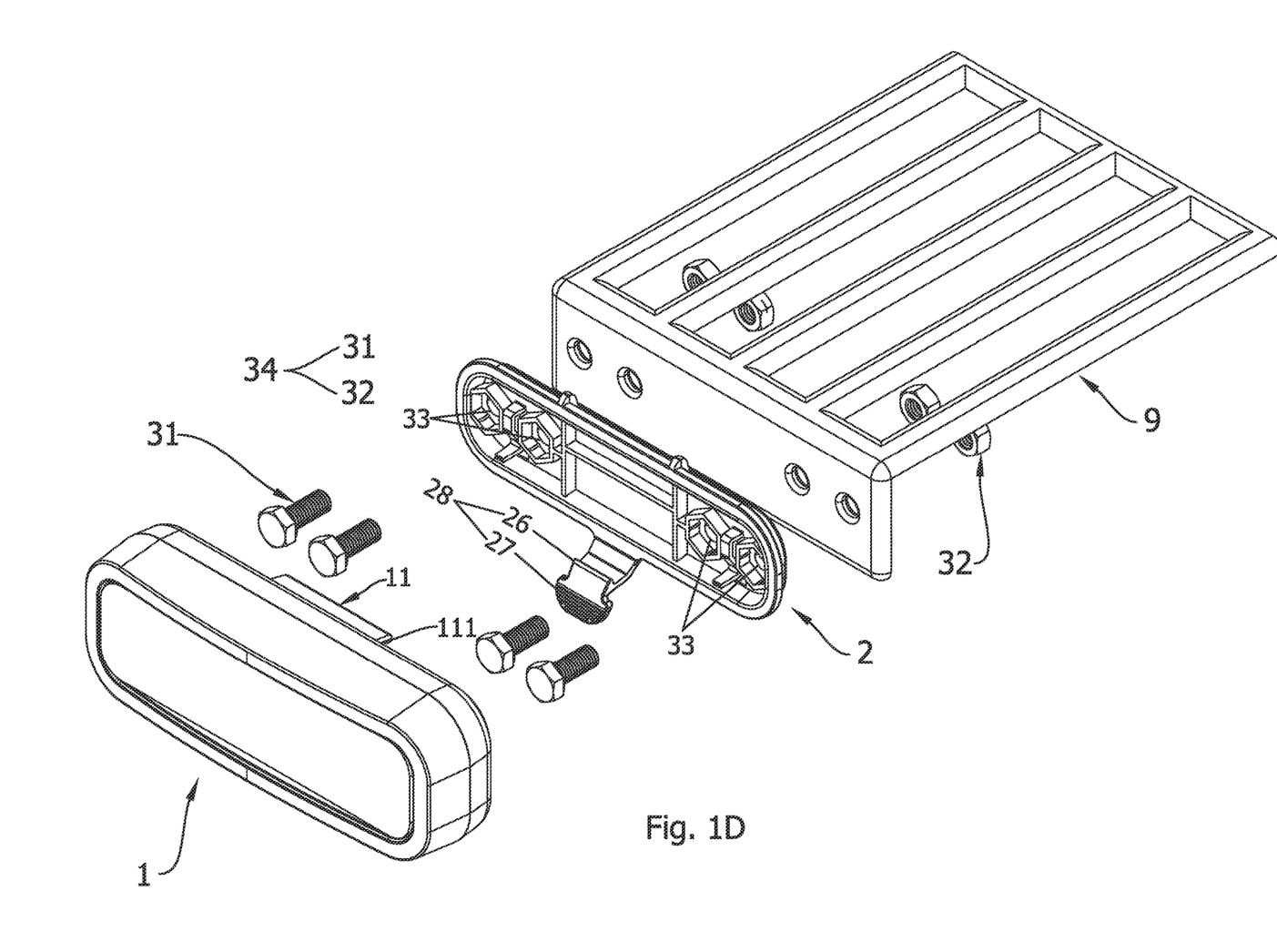
FIG. 1D is a schematic diagram of using the connector to lock the mounting fixture to the carrier according to a preferred embodiment of the present disclosure.

Please refer to FIG. 1D, which is a schematic diagram of using the connector 31 to lock the mounting fixture 2 to the carrier 9 according to a preferred embodiment of the present disclosure. It can be seen from FIGS. 1C and 1D that: during a first installation, the mounting fixture 2 is firstly locked to the carrier 9 by using the connector 31; and then the buckle 11 and the buckle structure 21 are used for locking, and the mounting and dismounting element 28 and the snap socket 14 are snapped together, which is similar to a clamping structure binding both the lamp 1 and the mounting fixture 2 together. The lamp 1 can not only be securely mounted on the carrier 9, but also can be easily unloaded after manually pressing the pressing piece 27, which has a significant advantage.

The second snap hook 111 shown in FIG. 1A is hooked to a groove that is disposed between the open end OPN and the closed end CLO. The open end OPN is in contact with the second snap hook 111 firstly; in addition, the open end OPN is also in the upper position and is wider, so that the second snap hook 111 can be combined with the engaging channel CH without being deliberately aligned. The closed end CLO is not only connected to the second snap hook 111, but the position below the closed end CLO is also relatively narrow, which is beneficial to constrain the second snap hook 111 after the second snap hook 111 is snapped into a snap groove CHT, so that the second snap hook 111 will not move in the snap groove CHT, as shown in FIG. 1C.

Figure 2:
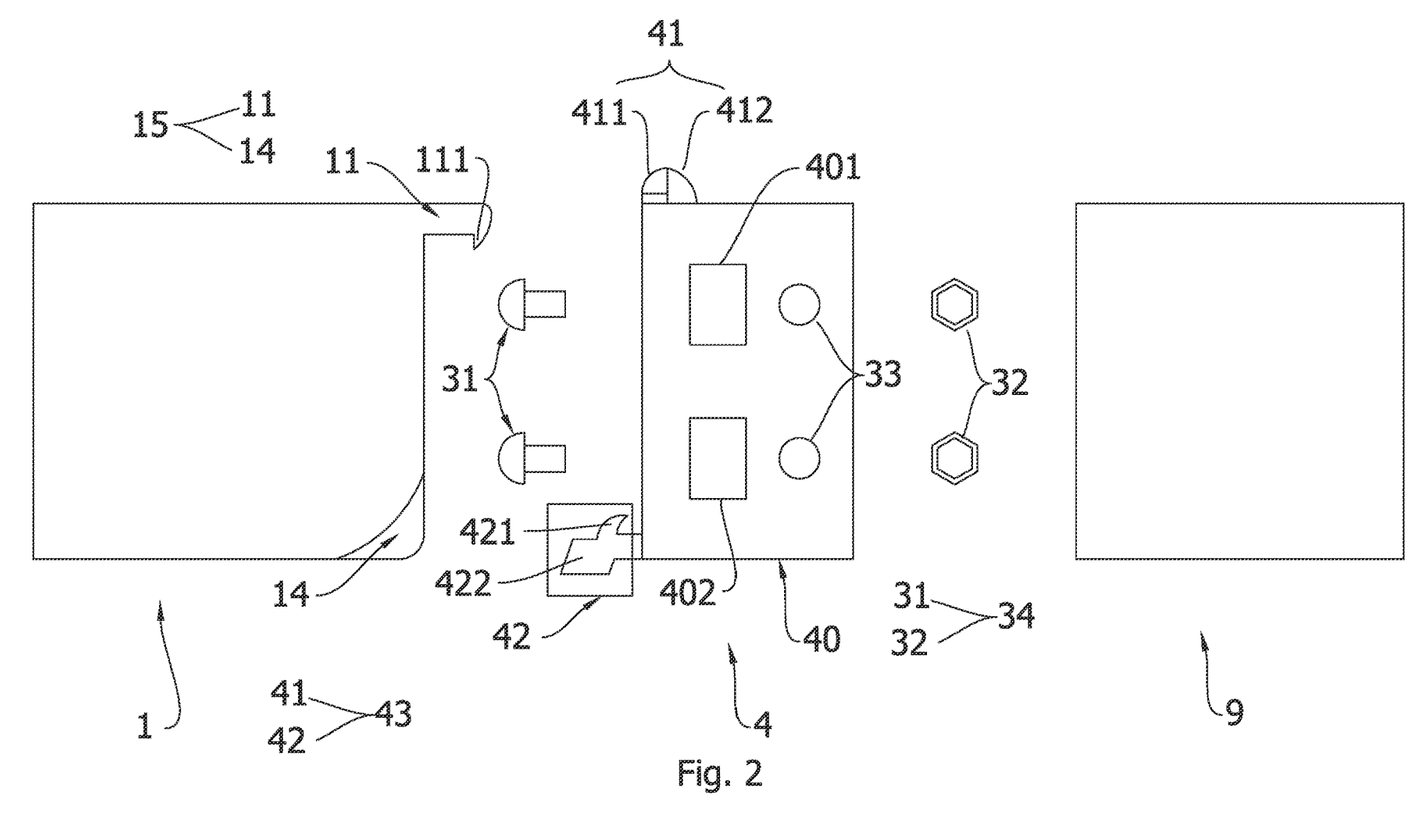
FIG. 2 is a schematic diagram showing a medium for disposing a lamp to a carrier according to another preferred embodiment of the disclosure.

Please refer to FIG. 2, which is a schematic diagram showing a medium 4 for disposing a lamp 1 to a carrier 9 according to another preferred embodiment of the disclosure. The medium 4 includes a medium body 40, a pre-stressed elastic member (401, 402), a buckle structure 41 and an assembly piece 42. The pre-stressed elastic members 401, 402 are disposed on the medium body 40, and generate a deformation and a pre-stress elasticity when the lamp 1 is connected with the carrier 9. The buckle structure 41 is configured to snap the lamp 1. The assembly piece 42 has a first part 421 configured to snap to the lamp 1, and a second part 422 configured to release the first part 421 and the buckle structure 41 from the lamp 1 through the pre-stress elasticity.

In any embodiment of the present disclosure, the medium 40 as shown in FIG. 2 is identical to, for example, the mounting fixture 2 shown in FIGS. 1A-1C. The buckle structure 41 and the assembly piece 42 form a first pre-stressing structure 43 to clamp the mounting fixture 2 to the lamp 1.

In any embodiment of the present disclosure, the buckle structure 41 includes a closed end 412 and an open end 411. The closed end 412 and the open end 411 respectively have a closed size WCLO and an open size WOPN as shown in FIG. 1A, wherein the closed size WCLO is smaller than the open size WOPN.

In any embodiment of the present disclosure, the lamp 1 further includes a buckle 11 and a snap socket 14. The open end 411 having the larger open size WOPN is convenient for facilitating a user to insert the buckle 11 into the buckle structure 41 without alignment, while the closed end 412 having the smaller closed size WCLO is for buckling the buckle 11 to avoid a relative movement between the buckle 11 and the buckle structure 41.

In any embodiment of the present disclosure, the first part 421 and the second part 422 are integrally formed in the medium 4 integrally, wherein the first part 421 is, for example, a first snap hook 26 as shown in FIG. 1A, and the second part 422 is, for example, a pressing member 27 as shown in FIG. 1A. The first snap hook 421 of the assembly piece 42 is snapped to the snap socket 14. The second part 422 of the assembly piece 42 bears an applied force, for example an external force, so that the first snap hook 421 is separated from the snap socket 14.

Please refer to FIG. 2, In in any embodiment of the present disclosure, the lamp 1 includes a snap socket 14 and the buckle 11 forming a second pre-stressing structure 15, so as to snap the lamp 1 to the medium 4. During a first installation, the medium 4 is fixed to the carrier 9 by a connector 34, wherein the connector 34 includes at least one set of bolts 31 and nuts 32. The at least one set of bolt 31 passes through a bolt hole 33 (or at least one of bolt hole 33), and locks the medium 4 to the carrier 9 by combining the bolt 31 and the nut 32 correspondingly. The lamp 1 can be manually disassembled to separate from the medium 4 when unmounting. The buckle 11 has a second snap hook 111, and the buckle 11 is combined with the buckle structure 41 by the second snap hook 111. The buckle structure 41 has, for example, an engaging channel CH as shown in FIG. 1A, and its shape is a rectangle, a trapezoid, or a combination thereof.

In any embodiment of the present disclosure, the configurations of the buckle 11 of the lamp 1 and the buckle structure 41 of the medium 4 can be interchanged with each other to form a new embodiment. That is, the buckle 11 can be arranged on the medium 4, and the buckle structure 41 can be arranged on the lamp 1. The configurations of the snap socket 14 of the lamp 1 and the assembly piece 42 of the medium 4 can be interchanged with each other to form a new embodiment. That is, the snap socket 14 can be disposed on the medium 4, and the assembly piece 42 can be disposed on the lamp 1.

Figure 3:
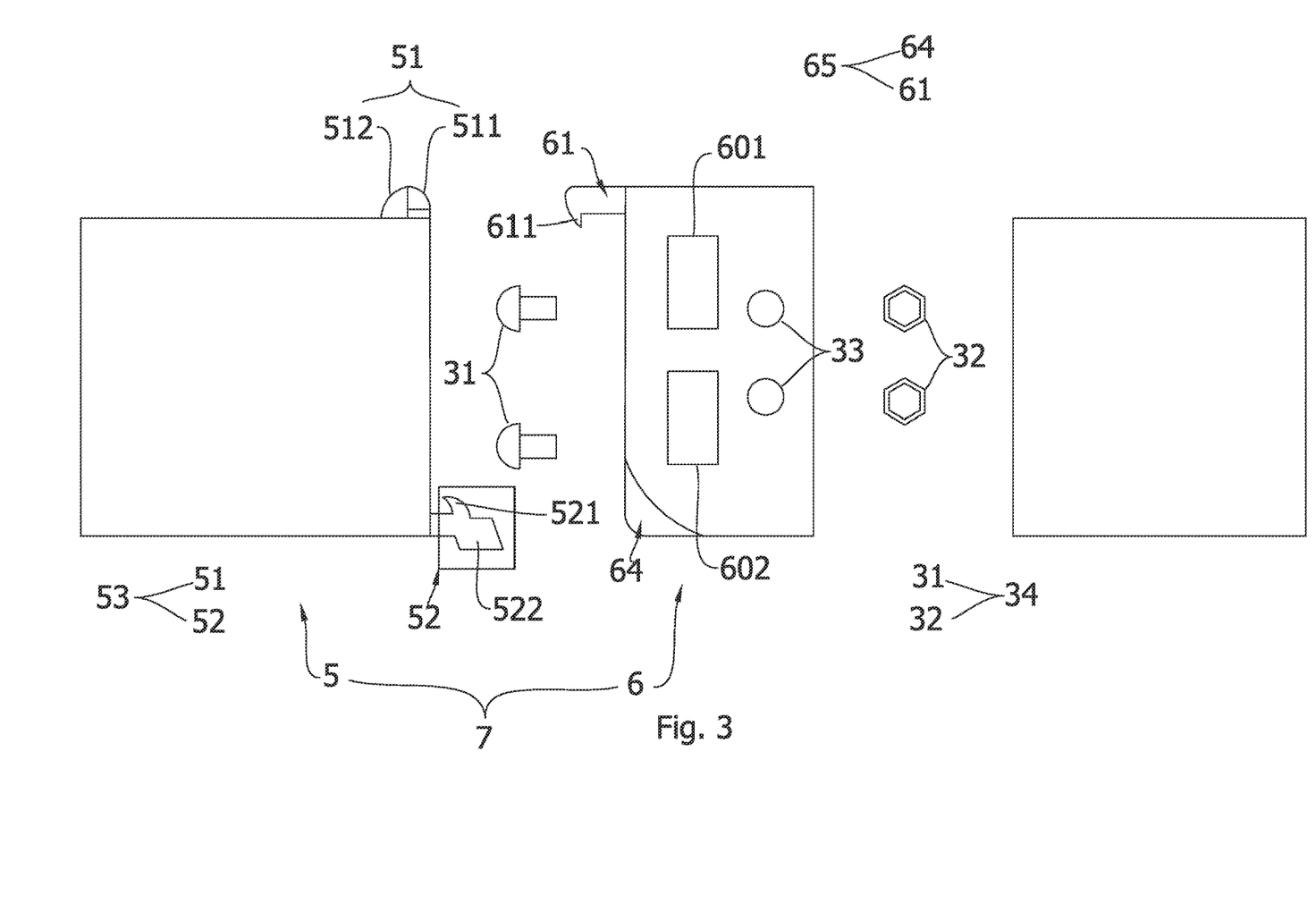
FIG. 3 is a schematic diagram showing a lamp assembly disclosed in another preferred embodiment of the present disclosure.

Please refer to FIG. 3, which is a schematic diagram showing a lamp assembly 7 disclosed in another preferred embodiment of the present disclosure. The lamp assembly 7 includes a lamp 5, a medium 6 and an assembly piece 52. The medium 6 is configured to connect the lamp 5 to a carrier 9. The assembly piece 52 is disposed between the lamp 5 and the medium 6 to connect the lamp 5 to the medium 6, wherein the assembly piece 52 includes a first part 521 and a second part 522. The first part 521 is configured to non-threadedly connect the lamp 5 with the medium 6. The second part 522 is configured to release the lamp 5 from the medium 6.

In any embodiment of the present disclosure, the medium 6 is, for example, a mounting fixture 2 as shown in FIG. 1A. The lamp 5 has a buckle structure 51; and the buckle structure 51 and the assembly piece 52 form a first pre-stressing structure 53 to clamp the lamp 5 to the medium 6. The buckle structure 51 includes a closed end 512 and an open end 511. The closed end 512 and the open end 511 respectively have a closed size WCLO and an open size WOPN as shown in FIG. 1A, wherein the closed size WCLO is smaller than the open size WOPN, the medium 6 further includes a buckle 61 and a snap socket 64. The open end 511 having the larger open size WOPN is convenient for facilitating a user to insert the buckle 61 into the buckle structure 51 without alignment, while the closed end 512 having the smaller closed size WCLO can buckle the buckle 61 to prevent a relative movement between the buckle 61 and the buckle structure 51.

In any embodiment of the present disclosure, the first part 521 and the second part 522 are integrally formed in the lamp 5, wherein the first part 521 is, for example, a first snap hook 26 shown in FIG. 1B, and the second part 522 is, for example, a pressing member 27 shown in FIG. 1B. The pressing member 27 bears an applied force to separate the first snap hook 26 from the snap socket 64.

In any embodiment of the present disclosure, the medium 6 includes a snap socket 64 and a buckle 61 forming a second pre-stress structure 65, so as to snap the medium 6 to the lamp 5. During the first installation, the medium 6 is fixed to a carrier 9 by a connector 34, wherein the connector 34 includes at least one set of bolts 31 and nuts 32, and the set of bolts 31 passes through the bolt hole 33 corresponding to the nut 31 to lock and fix the medium 6 on the carrier 9. The lamp 5 can be manually disassembled to separate from the medium 6 without using any tool when unmounting. The buckle 61 has a second snap hook 611, and the buckle 61 is connected with the buckle structure 51 by the second snap hook 611. The buckle structure 51 has, for example, an engaging channel CH as shown in FIG. 1A, and its shape is a rectangle, a trapezoid, or a combination thereof.

In any embodiment of the present disclosure, the medium 6 further includes a pre-stressed elastic member (601, 602). The pre-stressed elastic members 601 and 602 are disposed on the mediate body 60, and generate a deformation and a pre-stress elasticity when the lamp 5 is connected with the carrier 9. The buckle structure 51 is configured to snap the lamp 5. The assembly piece 52 has a first part 521 and a second part 522. The first part 521 is configured to snap to the lamp 5; and the second part 522 is configured to release the first part 521 and the buckle structure 51 from the lamp 5 through the pre-stressed elasticity.

In any embodiment of the present disclosure, the configuration of the buckle structure 51 of the lamp 5 and that of the buckle 61 of the medium 6 can be interchanged with each other to form a new embodiment. That is, the buckle structure 51 can be arranged on the medium 6, and the buckle 61 can be arranged on the lamp 5. The assembly piece 52 of the lamp 5 and the snap socket 64 of the medium 6 can be interchanged with each other to form a new embodiment. That is, the assembly piece 52 can be arranged on the medium 6, and the snap socket 64 can be arranged on the lamp 5.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A mounting fixture configured to connect a lamp with a carrier of a vehicle, wherein the lamp has a snap socket, comprising:
    a connector configured to connect the mounting fixture with the carrier;
    a pre-stressed elastic member configured to push the lamp, and forming a deformation for a pre-stressed elasticity;
    a buckle structure having a closed end with a closed size for generating a buckling force, and an open end with an open size, wherein the closed size is smaller than the open size;
    at least one positioning piece for restricting a relative movement between the mounting fixture and the lamp;
    a first snap hook configured to generate a snap pre-force in response to an elastic deformation of the mounting fixture, wherein the buckle structure and the first snap hook constitute a first pre-stressed structure to clamp the lamp to the mounting fixture through the buckling force and the snap pre-force; and
    a pressing piece, wherein when the pressing piece is subject to an external force, the first snap hook is separated from the snap socket, and the pre-stressed elastic member having the pre-stressed elasticity urges against the carrier to separate the lamp from the mounting fixture.

2. The mounting fixture as claimed in claim 1, wherein:
    the connector includes at least one set of bolt and nut;
    the lamp further includes a buckle and at least one positioning seat, and the buckle engages with the buckle structure; and
    a position of the at least one positioning piece corresponds to that of the at least one positioning seat so as to limit the relative movement between the mounting fixture and the lamp.

3. The mounting fixture claimed in claim 1, wherein:
    the first snap hook of the mounting fixture is snapped to the snap socket; and
    the lamp includes a buckle having a second snap hook, and combined with the buckle structure by the second snap hook.

4. The mounting fixture claimed in claim 1, wherein:
    the open end of buckle structure is close to the lamp and the closed end of the buckle structure is close to the second snap hook, wherein the open end is wider than the closed end.

5. The mounting fixture as claimed in claim 1, wherein:
    the buckle structure has a buckle channel having a shape of a rectangle, a trapezoid, or a combination thereof.

6. The mounting fixture as claimed in claim 1, wherein:
    the pre-stressed elastic member, the buckle structure, the first snap hook and the pressing piece are integrally formed with the mounting fixture.

7. The mounting fixture as claimed in claim 1, wherein:
    the lamp further includes a buckle having a second snap hook; and
    the buckle and the buckle structure form a second pre-stressed structure buckling the lamp to the mounting fixture.

8. The mounting fixture as claimed in claim 1, wherein:
    the first snap hook is integrally formed with the pressing piece; and
    the carrier is a bicycle rack, a motorcycle rack or a car rack.

9. A medium for connecting a lamp with a carrier of a vehicle, comprising:
    a medium body;
    a pre-stressed elastic member disposed on the medium body and generating a deformation and a pre-stressed elasticity when the lamp is connected with the carrier;
    a buckle structure including a closed end and an open end, and configured to snap the lamp; and
    an assembling piece having a first part configured to snap to the lamp and a second part configured to release the first part and the buckle structure from the lamp and to separate the lamp from the medium body by urging against the carrier through the pre-stressed elasticity of the pre-stressed elastic member.

10. The medium as claimed in claim 9, wherein:
    the medium is a mounting fixture; and
    the buckle structure and the assembling piece form a first pre-stressed structure to clamp the mounting fixture to the lamp.

11. The medium as claimed in claim 9, wherein:
    the closed end has a closed size and the open end has an open size, and the closed size is smaller than the open size.

12. The medium as claimed in claim 11, wherein:
    the lamp includes a buckle and a snap socket; and
    the open size of the open end is relatively larger for facilitating a user to insert the buckle to the buckle structure, while the closed size of the closed end is relatively smaller for buckling the buckle to avoid a relative movement between the buckle and the buckle structure.

13. The medium as claimed in claim 9, wherein:
    the lamp includes a buckle and a snap socket;
    the first part and the second part are formed in the medium integrally;
    the first part has a first snap hook being snapped to the snap socket; and
    when the second part is subject to an external force, the first snap hook is separated from the snap socket.

14. The medium as claimed in claim 9, wherein:
    the lamp includes a snap socket and a buckle, both of which form a second pre-stressed structure so as to connect the lamp with the medium;
    during a first installation, the medium is fixed to the carrier by a connecting joint, wherein the connecting joint includes at least one set of bolt and nut; and
    the lamp is separable from the medium upon unlocking.

15. The medium as claimed in claim 9, wherein:
    the lamp includes a buckle having a second snap hook, and the buckle is combined with the buckle structure by the second snap hook; and
    the buckle structure has a buckle channel having a shape of a rectangle, a trapezoid, or a combination thereof.

16. A lamp assembly for a vehicle, comprising:
    a lamp;
    a buckle structure including a closed end and an open end;
    a medium configured to connect the lamp to a carrier;

a pre-stressed elastic member disposed on the medium and generating a deformation and a pre-stressed elasticity when the lamp is connected with the carrier; and an assembling piece being configured to connect the lamp to the medium, wherein the assembling piece comprises:

a first part configured to non-threadedly connect the lamp with the medium; and a second part configured to release the lamp from the medium and to separate the lamp from the medium by urging against the carrier through the pre-stressed elasticity of the pre-stressed elastic member.

17. The lamp assembly as claimed in claim 16, wherein:
the medium is a mounting fixture; and
the buckle structure and the assembling piece form a first pre-stressed structure to clamp the mounting fixture to the lamp.

18. The lamp assembly as claimed in claim 16, wherein:
the closed has a closed size and the open end has an open size, and the closed size is smaller than the open size;
the lamp includes a buckle and a snap socket; and
the open size is relatively larger for facilitating a user to insert the buckle to the buckle structure, while the closed size is relatively smaller for buckling the buckle to avoid a relative movement between the buckle and the buckle structure.

19. The lamp assembly as claimed in claim 16, wherein:
the lamp includes a buckle and a snap socket;
the first part and the second part are formed in the medium integrally;
the first part has a first snap hook being snapped to the snap socket; and
when the second part is subject to an external force, the first snap hook is separated from the snap socket.

20. The lamp assembly as claimed in claim 16, wherein:
the lamp includes a snap socket and a buckle cooperatively forming a second pre-stressed structure for connecting the lamp with the medium;
during a first installation, the medium is fixed to the carrier by a connecting joint including at least one set of bolt and nut;
the lamp is separable from the medium upon unlocking;
the buckle has a second snap hook for combining with the buckle structure; and
the buckle structure has a buckle channel having a shape of a rectangle, a trapezoid, or a combination thereof.

* * * * *